(12) United States Patent
Graham et al.

(10) Patent No.: US 12,158,143 B2
(45) Date of Patent: Dec. 3, 2024

(54) POWER END FRAME WITH RESIDUAL COMPRESSIVE STRESS AND METHODS

(71) Applicant: Caterpillar Inc., Peoria, IL (US)

(72) Inventors: Curtis John Graham, Peoria, IL (US); Christopher Anthony Kinney, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 934 days.

(21) Appl. No.: 16/862,763

(22) Filed: Apr. 30, 2020

(65) Prior Publication Data

US 2021/0340978 A1 Nov. 4, 2021

(51) Int. Cl.
| | |
|---|---|
| F04B 53/22 | (2006.01) |
| B23K 26/356 | (2014.01) |
| B23K 26/70 | (2014.01) |
| B23K 31/00 | (2006.01) |
| B23P 6/04 | (2006.01) |
| E21B 43/26 | (2006.01) |
| F04B 1/04 | (2020.01) |
| F04B 1/22 | (2006.01) |
| F04B 53/16 | (2006.01) |

(52) U.S. Cl.
CPC ............ *F04B 53/22* (2013.01); *B23K 26/356* (2015.10); *B23K 26/70* (2015.10); *B23K 31/003* (2013.01); *B23P 6/04* (2013.01); *E21B 43/2607* (2020.05); *F04B 1/04* (2013.01); *F04B 1/22* (2013.01); *F04B 53/16* (2013.01)

(58) Field of Classification Search
CPC .... F04B 53/22; F04B 1/04; F04B 1/22; F04B 53/16; B23K 26/356; B23K 26/70; B23K 31/003; E21B 43/2607; B23P 6/04
See application file for complete search history.

(56) References Cited

U.S. PATENT DOCUMENTS

| | | |
|---|---|---|
| 9,828,990 B1 | 11/2017 | Marette |
| 9,879,659 B2 | 1/2018 | Kumar et al. |
| 2006/0280619 A1* | 12/2006 | Awwad ............... F04B 27/0852 417/269 |
| 2009/0230104 A1 | 9/2009 | Domec et al. |
| 2010/0170877 A1 | 7/2010 | Sano et al. |
| 2013/0180969 A1 | 7/2013 | Cheng et al. |
| 2016/0215362 A1* | 7/2016 | Xue ..................... B23K 26/146 |
| 2017/0218951 A1* | 8/2017 | Graham ................. F04B 17/05 |
| 2018/0156212 A1* | 6/2018 | Ballario ............... F04B 53/168 |
| 2019/0071749 A1* | 3/2019 | Serizawa ............. C21D 10/005 |
| 2019/0247957 A1* | 8/2019 | Stribling .................. B24C 1/10 |

* cited by examiner

*Primary Examiner* — Grant Moubry
*Assistant Examiner* — Ruben Picon-Feliciano

(57) ABSTRACT

A power end frame includes a housing and a face plate secured to the housing. During use, components of the power end frame, including the housing and the face plate, are subjected to large tensile stresses. This disclosure describes a method of imparting compressive stresses in the power end frame to resist these large tensile stresses.

20 Claims, 5 Drawing Sheets

POWER END FRAME WITH RESIDUAL COMPRESSIVE STRESS AND METHODS

TECHNICAL FIELD

This disclosure relates generally to industrial machines, and, more specifically, to manufacturing and remanufacturing components, such as housings, for machines including well stimulation pumps.

BACKGROUND

Conventional machines, e.g., well stimulation pumps used in hydraulic fracking or other high-pressure applications, are subjected to large stresses during operation. In some arrangements, the pump includes a power end and a fluid end connected to the power end. In examples, one or more gears in the power end drive pistons to generate pressure in the fluid end. Often, the power end and/or the fluid end include a number of components that are welded together. In use, pressure generated by the pistons and other loading at the fluid end cause tensile stresses on the power end. Moreover, stresses at the power end can result when not in use, e.g., during transport. These stresses can cause damage, often as stress cracks or fractures, at or near the welds on the power end. This damage can lead to leaking of fluids from the pump, which can be an environmental hazard and/or inhibit proper functioning of the pump, and in some cases, can lead to failure of the pump. Conventionally, smaller stress cracks are welded, e.g., to prevent leakage, or the entire power end (or pump) is replaced, discarding the damaged power end/pump. Accordingly, it may be useful to provide improved processes and systems that salvage at least a portion of the damaged pump and/or to increase the life of the power end, e.g., to reduce downtime associated with time-consuming repairs and/or waste.

U.S. Patent Application Publication No. 2017/0218951 (hereinafter referred to as the '951 reference) describes a fluid end block for well stimulation pump and method of remanufacturing the same. In particular, the '951 reference describes processes in which damage to a fluid end of a pump, such as a well stimulation pump, is repaired, to increase a service life of the fluid end. However, the '951 reference does not disclose details for remanufacturing a power end or a power end frame of a pump, such as a well stimulation pump. Moreover, the '951 reference does not disclose processes for manufacturing a power end frame having increased resistance to large tensile loads.

Example implementations of the present disclosure are directed toward overcoming the deficiencies described above.

SUMMARY

In an aspect of the present disclosure, a method includes providing a power end frame for a pump. The power end frame includes a face plate and a housing. The method also includes forming a weld proximate a junction of the face plate and a portion of the housing. The method also includes laser shock peening at least one of the weld or a surface proximate the weld to form a treated surface at the at least one of the weld or the surface proximate the weld. The treated surface has a residual compressive stress resulting from the laser shock peening.

In another aspect of this disclosure, a pump includes a fluid end and a power end connected to the fluid end. The power end includes a face plate; a housing; a weld formed on at least one of the face plate or the housing; and a treated surface on at least one of the weld or a surface proximate the weld. The treated surface has a residual compressive stress formed by laser shock peening.

In yet another aspect of this disclosure, a method of repairing a damaged power end of a pump includes providing the damaged power end; identifying a damaged portion of the damaged power end; and removing material proximate the damaged portion to create one or more machined surfaces. The method also includes forming a weld on the one or more machined surfaces and laser shock peening at least one of the weld or a surface proximate the weld to form a treated surface at the at least one of the weld or the surface proximate the weld. The treated surface has a residual compressive stress resulting from the laser shock peening.

DETAILED DESCRIPTION

This disclosure generally relates to stimulation pumps and methods for manufacturing power end frames and/or remanufacturing damaged power end frames for use in such pumps. Although examples of this disclosure are directed to well stimulation pumps, concepts described herein may be applicable to other machines; the disclosure is not limited to well stimulation pumps. Wherever possible, the same reference numbers will be used through the drawings to refer to the same or like features.

Figure 1:
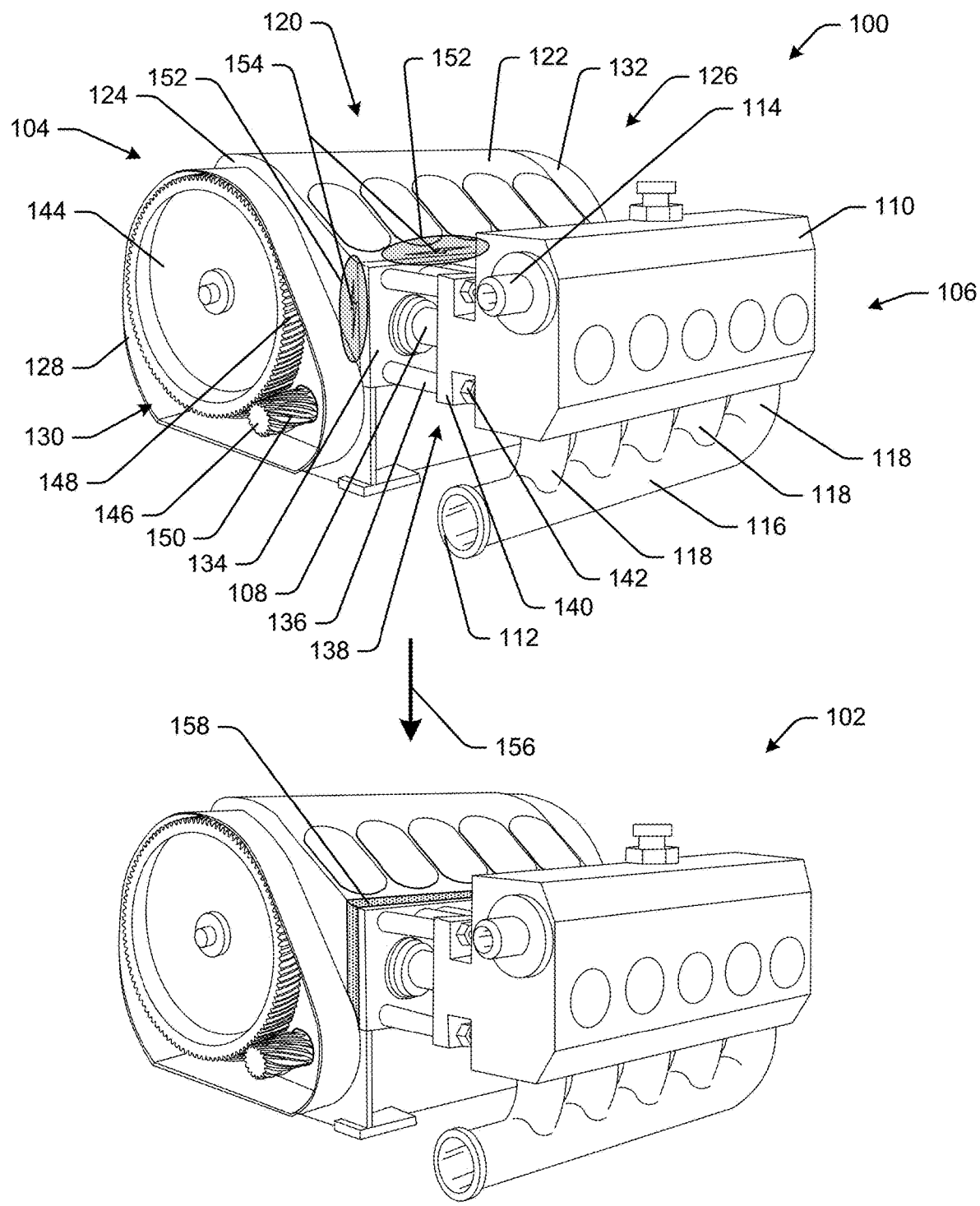
FIG. 1 illustrates a process of remanufacturing a damaged well stimulation pump, in accordance with an example of the present disclosure.

FIG. 1 is a visual flow diagram illustrating aspects of this disclosure. In more detail, FIG. 1 illustrates a damaged pump 100 and a remanufactured pump 102 formed according to techniques described herein. Specifically, FIG. 1 illustrates a process by which defects and/or other failures of the damaged pump 100 are improved via treating one or more surfaces using laser shock peening to impart residual compressive stresses in areas that have failed and/or are prone to failure as a result of being exposed to high tensile stresses. In aspects of this disclosure, the damaged pump 100 is a well stimulation pump, which may be used for high pressure fluid transfer, for instance, in hydraulic fracking operations. Other pumps may also benefit from the techniques described herein.

In more detail and with reference to FIG. 1, the damaged pump 100 includes a power end 104 and a fluid end 106 coupled to the power end 104. In general, the power end 104 includes a plurality of pistons 108 (of which only a single piston is shown and labelled) driven by an external source, e.g. a motor, to generate a pumping action at the fluid end 106. The fluid end 106 includes a fluid end housing 110. The fluid end housing 110 defines an interior cavity in which fluid is pressurized by the pistons 108. Fluid enters the fluid end housing 110 via an inlet 112 and exits the fluid end housing 110 via an outlet 114. The inlet 112 is illustrated as an open end of a conduit 116, with the conduit 116 defining a number of branches 118 fluidly connected to portions of the interior cavity of the fluid end housing 110. Five branches 118 are illustrated in FIG. 1, one corresponding to each of the pistons 118, but the conduit 116 can include more or fewer branches 118 in other implementations. Moreover, although only a single inlet 112 and conduit 116 are shown, in other implementations, the fluid end 106 may receive fluid via more than one inlet 112 and/or conduit 116. In use, a fluid source is coupled to the inlet 112 and one or more conduits are connected to the outlet 114, e.g., to carry fluid away from the pump 100.

The power end 104 generally includes a power end frame 120 comprising a number of components secured to each other. For instance, FIG. 1 shows a housing 122 having a generally arcuate outer surface and extending between a first end 124 and a second end 126. The outer surface of the housing 122, the first end 124, and the second end 126 generally define an internal cavity, described further below. As also illustrated, a first end wall 128 extends from the first end 124 and circumscribes a first end cavity 130. A second wall 132 similarly extends from the second end 126 and circumscribes a second end cavity (not visible in FIG. 1). The power end frame 120 also includes a face plate 134 proximate the fluid end 106. As detailed further herein, the face plate 134 may be affixed, e.g., welded, to the housing 122 to further define the internal cavity of the power end frame 120.

In the illustrated example, the fluid end 106 is secured to the power end 104 at the face plate 134. More specifically, FIG. 1 illustrates a plurality of posts 136 extending from a front surface of the face plate 134 to a mounting feature 138 on the fluid end 106. The posts 136 may act as spacers to maintain a predetermined distance between the face plate and the fluid end 106. In implementations, the pistons 108 extend from within the inner cavity of the housing 122 through the face plate 134 and into the fluid end 106, and the predetermined distance may be associated with a desired stroke of the pistons 108. In the illustrated embodiment, the mounting feature 138 includes a plurality of flanges 140 including holes or other receptacles for receiving a distal end of the posts 136. The distal ends received in the holes are threaded, and nuts 142 are used to secure the posts 136 to the mounting feature 138, e.g., at the flanges 140. Also in this example, the face plate 134 may have a plurality of threaded holes formed therein, and the posts 136 may be threaded on both ends. For instance, the pump 100 may be assembled by threading the posts 136 into the face plate 134, positioning the fluid end 106 such that distal ends of the posts 136 are received in holes formed through the flanges 140, and engaging the nuts 142 on the posts 136 to secure the fluid end 106 to the posts 136, and therefore to the power end 104.

As noted above, the pistons 108 extend from a position within the housing 122, through the face plate 134 and into the fluid end 106. In examples, the pistons 108 are driven to reciprocate in and out of the fluid end 106, as is generally conventionally known. For instance, the pistons 108 may be driven by a drive train including a power source and one or more power transmission components. FIG. 1 illustrates some of these components disposed in the first end cavity 130. More specifically, the power transmission components disposed in the first end cavity 130 include a bull gear 144 and a portion of a pinion shaft 146 in cooperation with the bull gear 144. The bull gear 144 includes a plurality of bull gear teeth 148 and the pinion shaft 146 includes a plurality of pinion gear teeth 150 that mesh with the bull gear teeth 148. In the example, the bull gear teeth 148 and the pinion gear teeth 150 comprise helical gears, although other types of gear teeth (or power transmission methods) may be used. In operation, a motor or other power source (not shown), causes the pinion shaft 146 to rotate, which, via cooperation of the bull gear teeth 148 and the pinion gear teeth 150, causes the bull gear 144 to rotate. Rotation of the bull gear causes components within the housing 122 to rotate, e.g., a crankshaft, which, via additional components, e.g., a connecting rod or the like. Accordingly, rotation of the bull gear 144 causes the pistons 108 to reciprocate relative to the power end 104, causing pumping of fluid through the fluid end 106. In use, an end cover extends at least partially over the first end wall 128 to enclose the first end cavity 130. That cover is removed (and not shown) in FIG. 1 for clarity.

Although not illustrated in FIG. 1, the power end 104 can also include a second bull gear, e.g., proximate the second end 126. The second bull gear may also have bull gear teeth that mesh with or otherwise cooperate with teeth formed at an opposite end of the pinion shaft 146. The opposite end of the pinion shaft 146 can also include a drive coupling. The drive coupling can be any coupling that allows the pinion shaft 146 to be driven by a power source, e.g., a motor or the like. Some example couplings can include a gear, a pulley, an in-inline coupling, or the like.

As described above, the power source drives the pinion shaft 146 to turn the bull gear 144 (and a second bull gear) to cause the pistons 108 to reciprocate. The reciprocating pistons 108 cause fluid flow through the fluid end 106. In some examples, the pistons 108 can have stroke lengths of 20 to 25 centimeters or longer and can reciprocate at rates up to or exceeding 330 revolutions per minute. Moreover, the pump 100 can weigh up to 10,000 kg or more. The speed at which the pistons 108 reciprocate, the mass load created by the weight of the pistons 108, and the mass load created by the weight of the fluid end 106 (which is spaced from the face plate 134 by the posts 136) generate large tensile stresses at the face plate 134, at connections between the face plate 134 and the housing 122, e.g., a weld between the face plate 134 and the housing 122, and/or at other areas of the housing surrounding the face plate 134. Over time, these stresses result in damage, which damage is represented in FIG. 1 as damaged areas 152. The damaged areas 152 are illustrated as stress fractures 154 in the housing 122. In other examples, the stress fractures 154 can be in any or all of the housing 122, a weld between the housing 122 and the face plate 134, the face plate 134, and/or other components of the power end frame 120. These stress fractures can result in leakage of fluids, reduced performance and/or other operational problems.

As generally illustrated by the arrow 156, techniques described herein are used to salvage the damaged pump 100, e.g., as the remanufactured pump 102. These techniques, which are detailed further herein, generally include machining the damaged pump 100 proximate the damaged areas 152, e.g., by grinding or cutting material and/or welds at and/or near the stress fractures, creating new welds 158 at locations associated with the damaged areas 152, and imparting compressive stresses at and/or near these new welds 158. The welds 158 may be formed using known techniques but are then further processed according to techniques described herein. Specifically, the welds 158 are processed using laser shock peening to induce a residual compressive stress therein.

Laser shock peening is a process by which energy from a laser is directed to a material (in this example, the welds 158 and/or surfaces proximate the welds 158) to induce a shock wave in the material. When this shock wave is above the dynamic yield strength of the welds 158, the material comprising the welds 158 (or other surface(s) being treated) plastically deforms. This plastic deformation leaves a residual plastic strain, which creates a compressive residual stress below the surface of the welds 158. The magnitude of the residual stress can vary based on a number of factors, including the laser power, laser pulse duration, number of shots at the area, material composition of the area being peened, overlays used during the laser shock peening process and/or other factors. In some implementations, laser shock peening can result in compressive stresses on the order of up to 300 MPa or more at depths of up to about four to eight mm. Accordingly, laser shock peening the welds 158, the base material (e.g., portions of the housing 122 and/or the face plate 134), and/or the areas adjacent the welds 158 will result in altered stress states of these surfaces. More specifically, these surfaces will have compressive stresses formed therein.

The residual compressive stresses formed in these surface(s) counteract the tensile stresses caused during operation of the remanufactured pump 102. Consider an example in which the forces imparted by the pistons 108, the weight of the fluid end 106, and/or other factors result in a tensile stress of 350 MPa at portions of the power end frame 120. Over time, as discussed above, this tensile stress can manifest as the stress fractures 154 in the damaged pump 100. However, according to the processes described herein, the remanufactured pump 102, and specifically the welds 158 and/or proximate surfaces that have been laser shock peened, can have a residual compressive stress of up to about 300 MPa. When put back into use, the remanufactured pump 102 can offset the tensile stresses better than the damaged pump 100, e.g., the damaged pump 100 prior to developing the stress fractures 154. Specifically, assuming the original pump was stress neutral when first put into use, welds at the face plate 134 and proximate surfaces are subjected to the entire 350 MPa. However, the remanufactured pump 102 has a compressive stress that counteracts on the order of about 85% of this tensile stress (e.g., 300 MPa compressive stress/350 Mpa tensile stress). Accordingly, in addition to the welds 158 providing continued functionality of the damaged pump 100, laser shock peening can provide increased performance of surfaces that are prone to failure, e.g., because of the increased resistance to the tensile stresses at these surfaces. The remanufactured pump 102 may have greater strength, e.g., additional resistance to the tensile stresses experienced at the power end frame 120, than the original pump.

Figure 2:
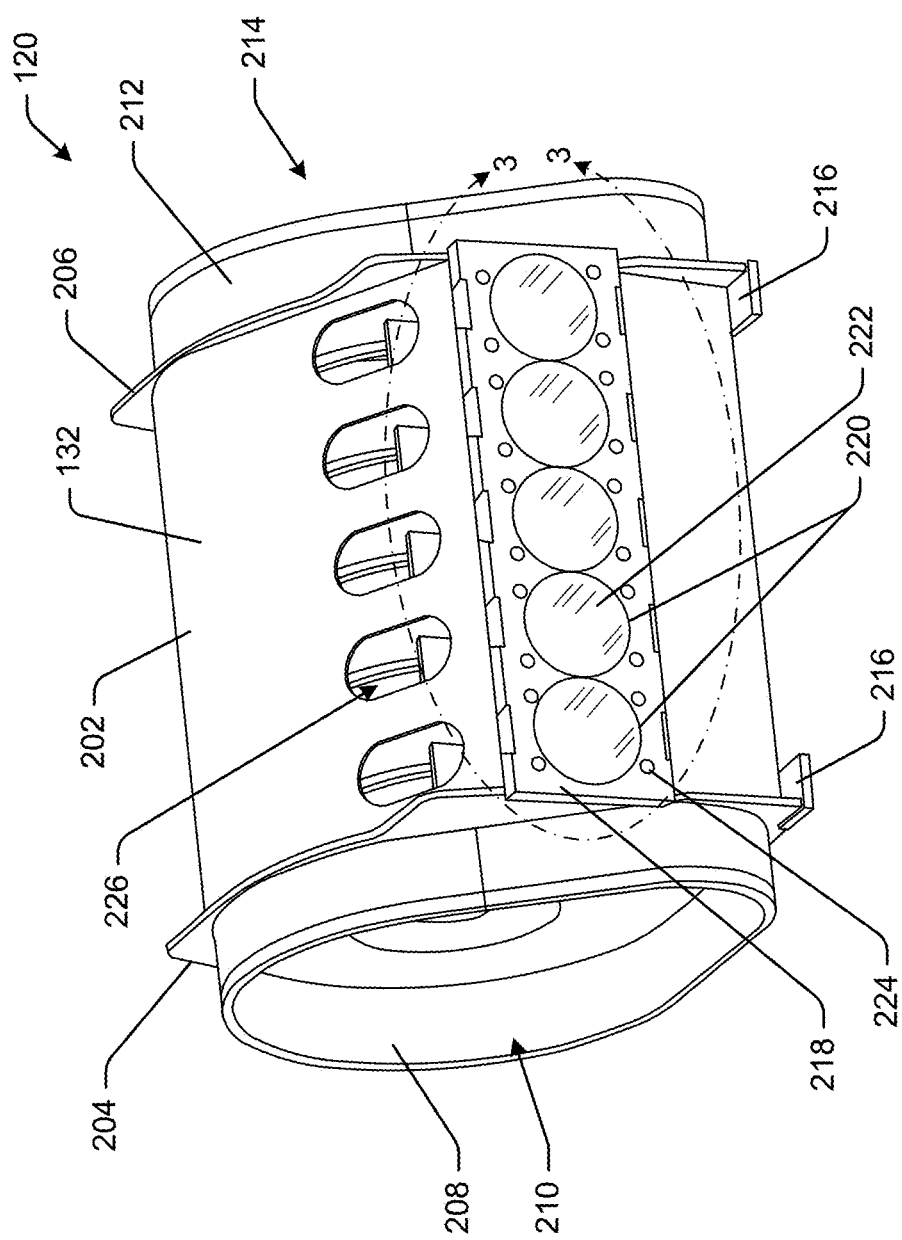
FIG. 2 is a perspective view of an example of a power end frame for a well stimulation pump, in accordance with another example of the present disclosure.

FIG. 2 is a perspective view showing aspects of a power end frame 200, which may be the power end frame 120, discussed above. As illustrated, the power end frame 200 can include a number of components, including a housing 202, which may be the housing 122, extending between a first end plate 204 and a second end plate 206. A first end wall 208 extends from an outer surface of the first end plate 204, e.g., in a direction away from the housing 202, to define sides of a first end cavity 210. Similarly, a second end wall 212 extends from an outer surface of the second end plate 206, e.g., in a direction away from the housing 202 to define sides of a second end cavity 214 (obscured in FIG. 2 by the second end wall 212). Feet 216 (two of which are visible in FIG. 2) are provided at bottom corners of the housing 202, the first end plate 204, and/or the second end plate 206. FIG. 2 also illustrates that the power end frame 200 includes a face plate 218 disposed on a portion of the housing 202. The face plate 218 extends generally between the first end plate 204 and the second end plate 206. The first end plate 204, the second end plate 206, and the face plate 218 are referenced herein as "plates" because they may be formed from steel or other metal plates in some implementations. However, this disclosure is not limited to the use of plates. Without limitation, aspects of the power end frame 200 can include castings, such as steel and/or iron castings.

The face plate 218 may be the same as or substantially similar to the face plate 134, discussed above. In the illustrated example, the face plate 218 can include a number (five in the example) of circular or substantially circular cutouts 220 that circumscribe open ends of cylinders 222 disposed in the housing 202. The cylinders 222 are configured to receive pistons, such as the pistons 108 discussed above. The face plate 218 also includes a plurality of threaded holes 224, generally arranged in arrays around the cutouts 220. The threaded holes 224 may be through holes, e.g., extending through the thickness of the face plate 218, and are configured to receive threaded ends of spacers or stay rods, such as the posts 136 discussed above. The face plate 218 is configured to be secured to the housing 202, e.g., such that the housing 202, the first end plate 204, the second end plate 206, and the face plate 218 define an inner cavity 226. For instance, the cylinders 222 extend into the inner cavity 226. Drive transmission elements, e.g., crank shafts, pinion shafts, axles, or the like may also be disposed, at least partially, in the inner cavity 226.

Figure 3:
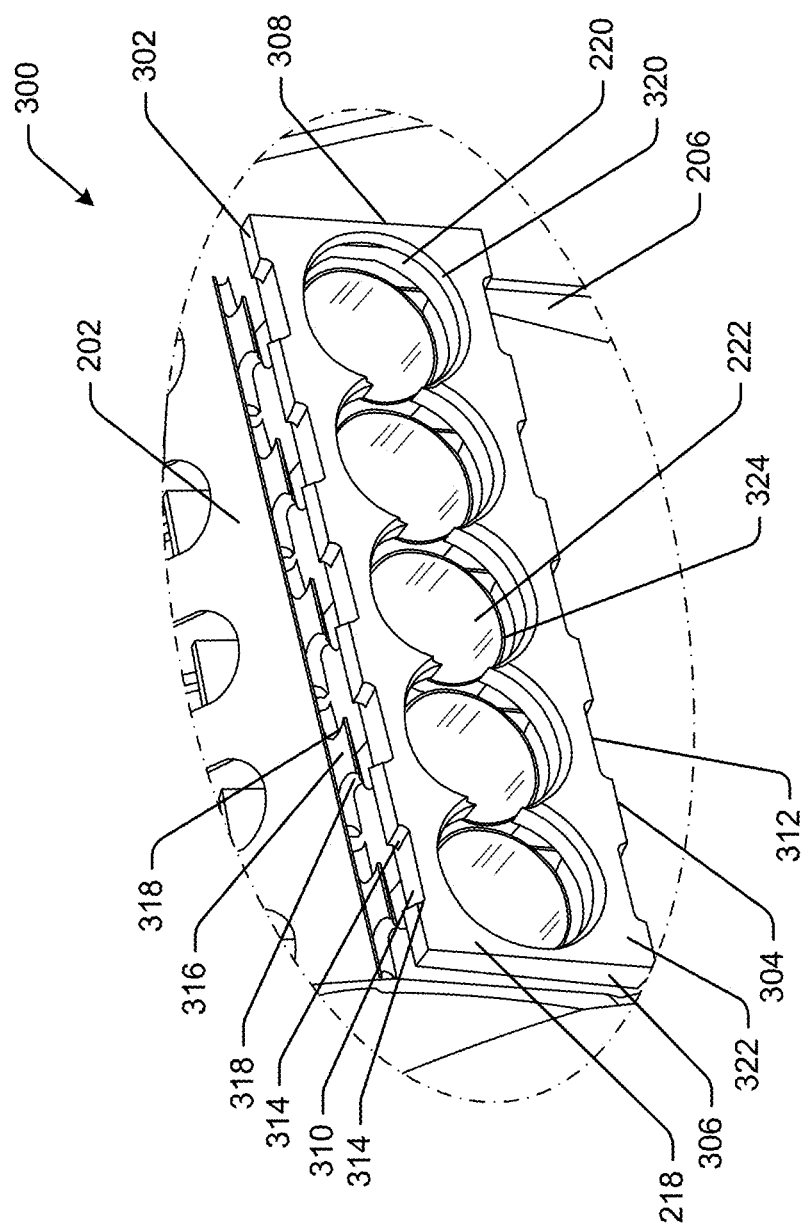
FIG. 3 is a partial exploded perspective view of the power end frame of FIG. 2, in accordance with yet another example of the present disclosure.

FIG. 3 is a partially exploded section view of the power end frame 200 taken along section line 3-3 in FIG. 2. More specifically, FIG. 3 includes a section view 300 showing the face plate 218 spaced from the housing 202. As illustrated, the face plate 218 extends vertically (in the illustrated orientation) between a top edge 302 and a bottom edge 304 and laterally between a first side edge 306 and a second side edge 308. A plurality of first grooves 310 are formed in the top edge 302 of the face plate 218 and a plurality of second grooves 312 are formed in the bottom edge 304 of the face plate 218. The first grooves 310 extend laterally between opposite sides 314 and extend a (vertical) depth from the top edge 302. As illustrated, the opposite sides 314 are angled relative to each other, although in other examples the opposite sides 314 may be parallel or angled differently from the illustrated orientation. The second grooves 312 may be substantially similar to the first grooves 310, but formed in the bottom edge 304.

As also shown in FIG. 3, the first grooves 310 are configured to cooperate with tabs 316 formed on or fixed relative to the housing 202. The tabs 316 are protrusions or similar features configured to be received in the first grooves 310. For instance, the tabs 316 are illustrated as having opposing sides 318 generally sized and shaped complimentarily to the first grooves 310. Although not illustrated in FIG. 3, similar tabs may be provided on or fixed relative to the housing 212 to be received in the second grooves 312. The tabs 316 may be formed integrally with the housing 202 or, in some examples, can be machined separately and mounted to the housing, e.g., using fasteners, welding, or the like. The tabs 316 and the grooves 310, 312 may promote alignment of the face plate 218 relative to the housing 202 and/or may promote securement of the face plate 218 to the housing 202. However, this disclosure is not limited to the tab/groove implementation illustrated; other implementations may be used to secure and/or align the face plate 218 and the housing 202.

FIG. 3 also provides additional detail about the cutouts 220. As illustrated, the cutouts 220 may be a plurality of overlapping circular cutouts that together form a single cutout through the face plate 218. In the example, the relatively close spacing of the cylinders 222 may require that the cutouts 220 overlap, whereas the cutouts 220 may be discrete cutouts in implementations in which the cylinder are spaced farther apart. As also illustrated in FIG. 3, edges of the cutouts 220 may not be normal to faces of the face plate 218 and/or may have varied cross-sections. For instance, a radius 320 may be formed at an edge of the cutouts 220 proximate a front face 322 of the face plate 218. In examples when the face plate 218 is secured to the housing 202, the front face 322 may be substantially flush with a terminal end 324 of the cylinders 222, and the radius 320 provides a well or channel in which a weld can be formed, e.g., without extending outwardly relative to the front face 322. Although a radius is shown, other examples can include chamfers or other shapes or features.

Returning now to FIG. 2, it is apparent that the power end frame 200 includes a number of different components, which may be separately fabricated, but that are then affixed to each other. In examples, the power end frame 200 may be a weldment, e.g., in which the disparate components are welded together. For instance, the face plate 218 can be welded to the housing 202, e.g., at a perimeter of the face plate 218 and/or at a junction of the tabs 316 and the grooves 310, 312. Moreover, the face plate 218 can be secured to the cylinders 222 via welds formed proximate the cutouts 220. In examples, these welds can be formed and then treated with laser shock peening processes. As discussed above, laser shock peening induces a compressive stress in the peened material. By laser shock peening any and all welds securing the face plate 218 to the housing 202 and/or cylinders 222, the ability of those welds to withstand the tensile stresses resulting from operation of a pump using the power end frame 200 is improved.

Moreover, the processes described herein are not limited to laser shock peening welds securing the face plate 218 to the housing 202. Any welds, or surfaces, or surfaces proximate welds may be imparted with residual compressive stresses using laser shock peening. Without exception, portions of the housing 202, the first end plate 204, and/or the second end plate 206 proximate junctions therebetween and/or welds formed at those junctions can be subjected to the processes described herein. Similarly, portions of the feet 216 and/or welds formed at junctions between the feet 216 and one or more of the housing 202, the first end plate 204, and/or the second end plate 206 can be subjected to laser shock peening to impart a residual compressive stress therein.

As will be appreciated from the power end frame 200, this disclosure is not limited to remanufacturing of damaged pumps, such as the damaged pump 100 discussed above. While techniques described can be applicable to power end frame repair and remanufacture, they also may be applicable to power end frame manufacture. As will be appreciated, the welds and/or portions of material indicated herein as benefiting from laser shock peening can be laser shock peened at the time of manufacture. By applying the techniques to newly manufactured power end frames, new pumps can be made with longer expected service lives, requiring less maintenance and repair.

Figure 4:
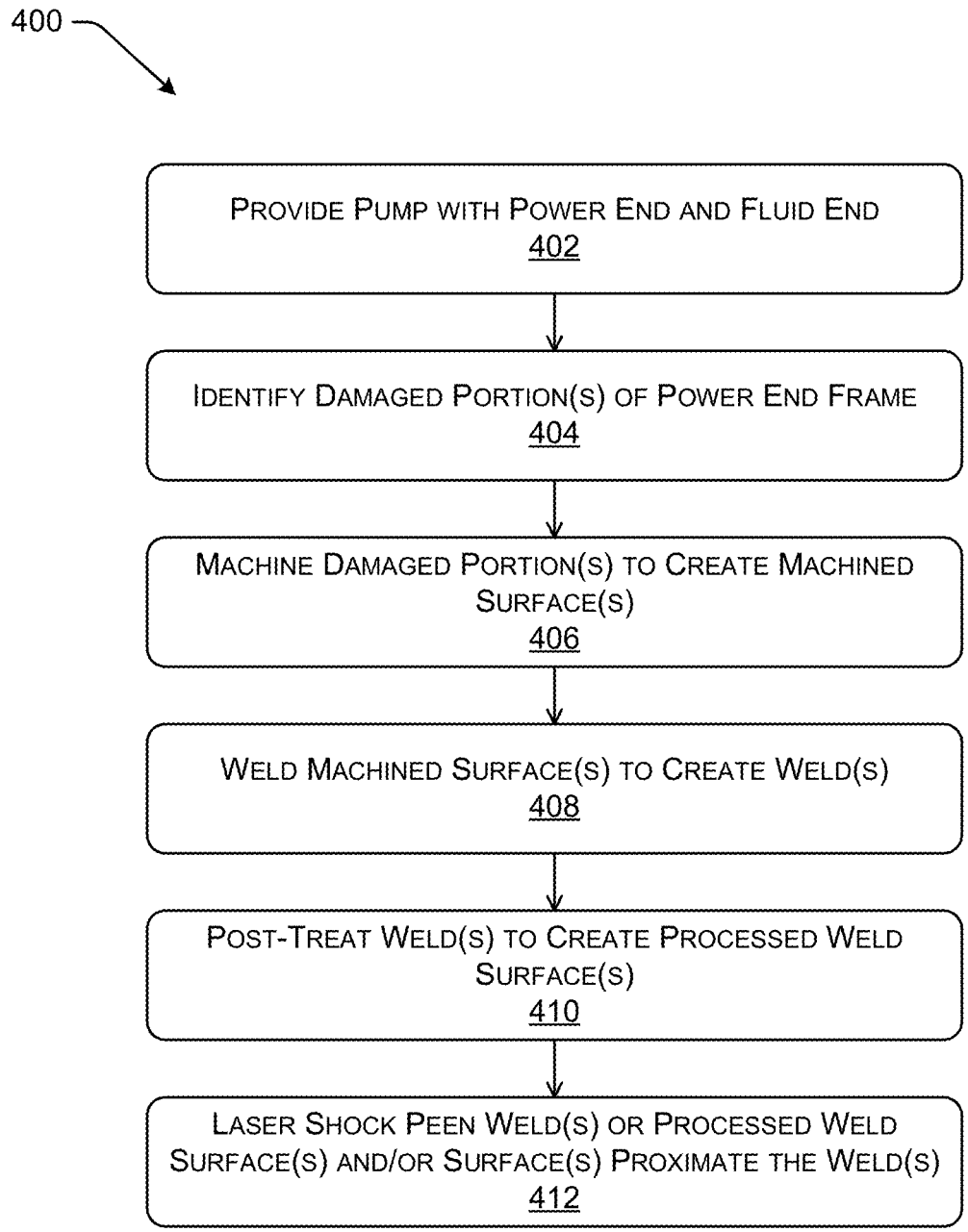
FIG. 4 is a flowchart illustrating a method of remanufacturing a pump, in accordance with examples of the present disclosure.

FIG. 4 is a flowchart illustrating an example method 400 of remanufacturing a pump, such as a well stimulation pump. As discussed further herein, remanufacturing a pump according to the techniques described herein may reduce waste by obviating the need to scrap an entire power end frame, e.g., when only a portion of the power end frame is damaged. In some instances, remanufacturing a pump according to the techniques described herein may result in improved longevity of the pump, even relative to a new pump. The techniques described in association with the method 400 can be used in connection with the remanufactured pump 102, but the method 400 may be used to remanufacture other damaged pumps, as well.

At an operation 402, the method 400 includes providing a pump with a power end and a fluid end. As detailed above with reference to FIG. 1, a pump can include the power end 104 and the fluid end 106. The power end 104 may transmit power, e.g., from a motor or other source, to a plurality of pistons, such as the pistons 108. The pistons interface with the fluid end 106 to pump fluid through the fluid end 106. The power end 104 can include a face plate 134 through which the pistons 108 extend and at which the fluid end 106 is secured to the power end 104. In some examples, the operation 402 can also include disassembling portions of the pump. For instance, the fluid end 106 may be removed from the posts 136, e.g., by removing the nuts 142. Moreover, the posts 136 can be removed from the face plate 134. Other components, such as the pistons 108, the bull gear 144, the pinion shaft 146, and/or the like may be removed from the power end frame 120.

At an operation 404, the method 400 includes identifying one or more damaged portions of the power end frame. For example, the power end frame 120 of FIG. 1 is illustrated as included the damaged areas 152, which can include the stress fractures 154. The stress fractures 154 can be the result of tensile stresses acting on the face plate 134, e.g., resulting from the fluid end 106 and/or operation of the pistons 108, as discussed above. In some cases, the stress fractures 154 manifest at welds retaining the face plate 134 on the housing 122 and/or at areas proximate those welds. In extreme examples, the stress fractures 154 can create cracks or seams through which fluid inside the housing 122 can leak. Such leakage can present an environmental hazard. Although the junction between the face plate 134 and the housing 122 is a common point of failure for conventional power end frames, other damaged areas may also manifest, and such areas can also or alternatively be identified at the operation 404.

At an operation 406, the method 400 includes machining the damaged portion(s) to create one or more machined surfaces. For example, when the damaged portion(s) identified at the operation 404 include stress fractures in a weld securing the face plate 134 to the housing 122 and/or to one of the cylinders 222, the operation 406 can include grinding out portions of the welds that have failed. In other examples, the face plate 134 may be completely removed from the housing 122, e.g., by cutting, grinding, or other techniques. Once removed, existing weld material remaining on the face plate 134 and/or the housing may be machined off. In other examples, e.g., in which the stress fractures 154 are in material comprising the housing 122 and/or the face plate 134, areas including and/or proximate the stress fractures may be machined, e.g., using drilling, cutting, grinding, or other material removal techniques, to remove the stress fractures and provide the machined surfaces.

At an operation 408, the method 400 includes welding the machined surface(s) to create one or more welds. For example, welds may be formed at any and all junctions and/or surfaces from which material was removed at the operation 406. The welding of the operation 408 may be done using conventional welding techniques, including but not limited to MIG welding, TIG welding, SMAW welding, or the like. Moreover, the welding of the operation 408 may result in any number of types of welds, including but not limited to fillet welds, butt welds, corner welds, or the like. The operation 408 may also include pre-processing, e.g., preparation of the machined surfaces, in addition to the machining performed at the operation 406. Without limitation, pre-processing can include heating the machined surfaces and/or material surrounding the machined surfaces prior to creating the weld.

At an operation 410, the method 400 can optionally include post-treating the weld(s) to create one or more processed weld surfaces. For example, the operation 410 can prepare the weld(s) for laser shock peening, as described further below. In examples, the post-treating of the operation 410 can include heat treating the weld, e.g., by attaining and/or maintaining a temperature at the weld and/or at surfaces proximate the weld. For example, controlling the rate at which a weld cools can reduce residual tensile stresses. In some examples, post-treating can include machining the weld(s). For instance, the weld(s) may be machined to impart desired features at an exposed surface of the weld, e.g., to promote laser shock peening. A weld may be machined to have a flatness within some desired tolerance, for example. Other post-processing to prepare the weld(s) for laser shock peening may also be implemented at the operation 410. As noted above, the operation 410 may be optional. In some examples, the weld(s) created at the operation 408 may be sufficient for laser shock peening.

At an operation 412, the method 400 includes laser shock peening the weld(s) or the processed weld surface(s) and/or one or more surfaces proximate the weld(s). As detailed further herein, laser shock peening imparts compressive stresses to treated surfaces. The weld(s) and surfaces proximate the weld(s) are under heavy tensile stresses during operation, and the compressive stresses in the material resulting from the laser shock peening counteract these tensile stresses, which can reduce failures, e.g., by reducing stress fractures, and increase the useful life of the remanufactured part, such as the remanufactured pump 102. Characteristics of the residual compressive stresses imparted by the laser shock peening of the operation 412 can vary based on the application. As will be understood, the greater the compressive stress and/or the deeper the stress is imparted into the weld/material, the greater the resistance to tensile stresses acting on the power end frame. In non-limiting examples, the laser shock peening may impart compressive stresses up to about 300 MPa or more, with some implementations imparting compressive stresses of from about 200 MPa to about 300 MPa. In other non-limiting examples, laser shock peening of the operation 412 can impart compressive stresses to a depth of about 8 mm or more, with some implementations imparting compressive stresses to depths of from about 4 mm to about 8 mm. As discussed above, the depth and/or intensity of the compressive stress can vary based on many factors. Without limitation, the material that is laser shock peened, the intensity of the laser beam used, the duration of time (e.g., a pulse duration) for which the laser energy is applied, and the number of times the laser is applied (e.g., a number of shots), may influence the depth and/or intensity of the residual compressive stress.

The method 400 allows for repair of a machine, such as the damaged pump 100, without the need to scrap entirely the power end frame 120. The techniques therefore provide for reduced waste. In some instances, since the frame can be on the order of about 2000 kg, the waste reduction and/or the material cost of a replacement can be significant. Moreover, because laser shock peening according to this disclosure imparts residual compressive stresses that counteract tensile stresses acting on the power end frame 120, the remanufactured pump 102 may be more resistant to future stress fractures and/or other failures caused by such tensile stresses.

While FIG. 4 illustrates a process by which a damaged pump (or damaged power end frame) can be remanufactured for continued use and/or with improved performance, techniques described herein are also applicable to manufacturing a (e.g., new) pump.

Figure 5:
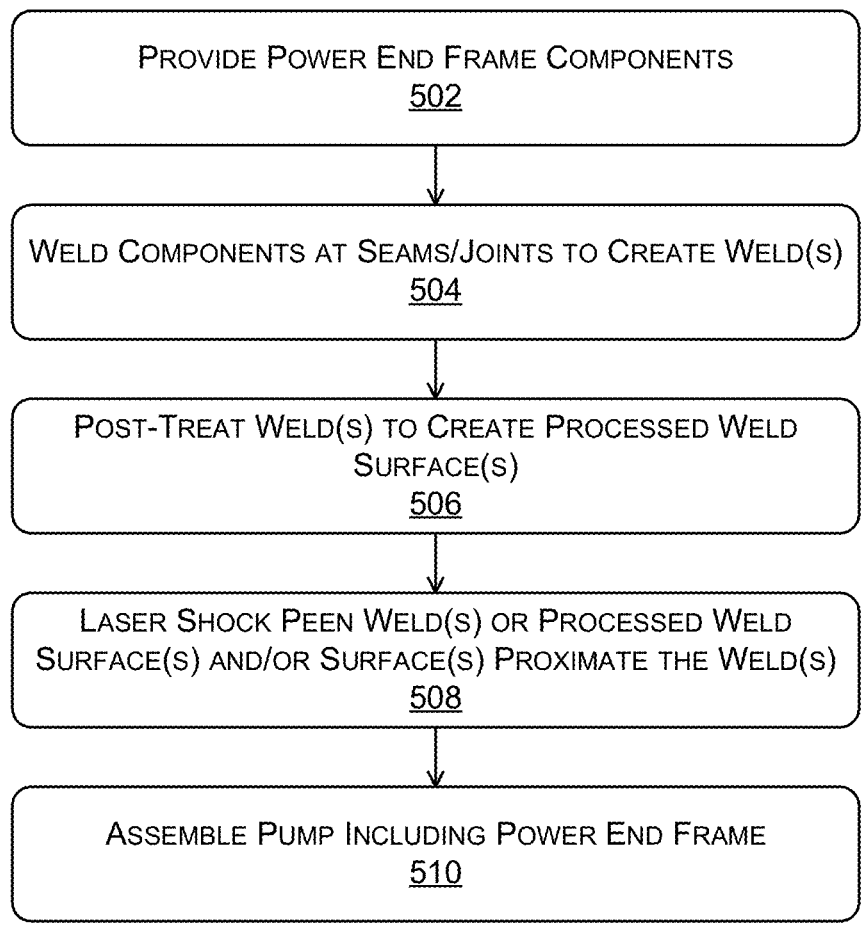
FIG. 5 is a flowchart illustrating a method of manufacturing a power end frame, in accordance with examples of the present disclosure.

FIG. 5 is a flowchart illustrating an example method 500 of manufacturing a pump, such as a well stimulation pump. As discussed further herein, manufacturing a pump according to the techniques described herein may result in improved longevity of the pump, e.g., by increasing resistance to tensile stresses acting on a power end frame of the pump. The techniques described in association with the method 500 can be used in connection with the power end frame 200, but the method 500 may be used to manufacture other types of power end frames, as well.

At an operation 502, the method 500 includes providing power end frame components. As detailed above with reference to FIG. 2, a power end frame 200 can include the housing 202, the first end plate 204, the second end plate 206, first end wall 208, the second end wall 212, the feet 216, the face plate 218, and/or additional components. As illustrated in FIG. 3, the face plate 218 and the housing 202 can include features for securing and/or aligning those components relative to each other. In some instances, various of the components may be comprises of metal, such as steel, and may include sheets, plates, bent components, machined components, cast components, assemblies, sub-assemblies, or the like.

At an operation 504, the method 500 includes welding the components at seams/joints to create one or more welds. In some examples, the power end frame 200 can be a weldment formed by welding the multiple components together. For example, welds can be formed at a junction of the face plate 218 and housing 202, at a junction of the cutouts 220 and the cylinders 222, at a junction between the housing 202 and the first end plate 204, at a junction between the housing 202 and the second end plate 206, at a junction between the first end plate 204 and the first end wall 208, at a junction between the second end plate 206 and the second end wall 212, at a junction between the feet 216 and one or more components to which they abut, at seams in the first end wall 208, at seams in the second end wall 212, and/or any other junctions or seams. As with the operation 408 described above, the welding of the operation 504 may be done using conventional welding techniques, including but not limited to MIG welding, TIG welding, SMAW welding, or the like. Moreover, the welding of the operation 504 may result in any number of types of welds, including but not limited to fillet welds, butt welds, corner welds, or the like. The operation 504 may also include pre-processing, e.g., preparation of the to-be-welded components and/or surfaces. Without limitation, pre-processing can include heating the machined surfaces and/or material surrounding the machined surfaces prior to creating the weld, machining the surfaces, and/or other known processes.

At an operation 506, the method 500 can optionally include post-treating the weld(s) to create one or more processed weld surfaces. For example, the operation 506 can be substantially identical to the operation 410 and can likewise prepare the weld(s) for laser shock peening. In examples, the post-treating of the operation 506 can include heat treating the weld, e.g., by attaining and/or maintaining a temperature at the weld and/or at surfaces proximate the weld. For example, controlling the rate at which a weld cools can reduce residual tensile stresses. In some examples, post-treating can include machining the weld(s). For instance, the weld(s) may be machined to impart desired features at an exposed surface of the weld, e.g., to promote laser shock peening. A weld may be machined to have a flatness within some desired tolerance, for example. Other post-processing to prepare the weld(s) for laser shock peening may also be implemented at the operation 506. As noted above, the operation 506 may be optional. In some examples, the weld(s) created at the operation 504 may be sufficient for laser shock peening.

At an operation 508, the method 500 includes laser shock peening the weld(s) or the processed weld surface(s) and/or one or more surfaces proximate the weld(s). As detailed further herein, laser shock peening imparts compressive stresses to treated surfaces. The weld(s) and surfaces proximate the weld(s) are under heavy tensile stresses during operation, and the compressive stresses in the material resulting from the laser shock peening counteract these tensile stresses, which can reduce failures, e.g., by reducing stress fractures, and create a power end frame 200 with increased life. Characteristics of the residual compressive stresses imparted by the laser shock peening of the operation 508 can vary based on the application. As will be understood, the greater the compressive stress and/or the deeper the stress is imparted into the weld/material, the greater the resistance to tensile stresses acting on the power end frame. In non-limiting examples, the laser shock peening may impart compressive stresses up to about 300 MPa or more, with some implementations imparting compressive stresses of from about 200 MPa to about 300 MPa. In other non-limiting examples, laser shock peening of the operation 508 can impart compressive stresses to a depth of about 8 mm or more, with some implementations imparting compressive stresses to depths of from about 4 mm to about 8 mm. As discussed above, the depth and/or intensity of the compressive stress can vary based on many factors. Without limitation, the material that is laser shock peened, the intensity of the laser beam used, the duration of time (e.g., a pulse duration) for which the laser energy is applied, and the number of times the laser is applied (e.g., a number of shots), may influence the depth and/or intensity of the residual compressive stress.

At an operation 510, the method 500 includes assembling a pump including the power end frame. For example, and as discussed herein, the power end frame 200 comprises a portion of a pump, such as a well stimulation pump. In examples, the power end frame 200 can be used in place of the power end frame 120 shown in FIG. 1. Without limitation, the power end frame 200 can house be used to mount power transmission components, including the bull gear 144, the pinion shaft 146, and related components. Moreover, the pistons 108 can be disposed partially in the power end frame 200, and a fluid end, such as the fluid end 106 can be secured to the power end frame 200, e.g., using the posts 136.

The method 500 allows for fabrication of a new machine, such as a pump including the power end frame 200. Because laser shock peening according to this disclosure imparts residual compressive stresses that counteract tensile stresses acting on the power end frame 200, a pump made with the power end frame 200 may have improved resistance to stress fractures and/or other failures caused by such tensile stresses.

INDUSTRIAL APPLICABILITY

The present disclosure provides pumps, remanufactured pumps, and methods of manufacturing or remanufacturing pumps. The techniques are particularly for fabricating and/or repairing a drive end frame for use on a well stimulation pump.

According to some implementations, a damaged pump 100 can include one or more damaged areas 152 that prevent the damaged pump 100 from performing correctly. For instance, the damaged areas 152 can result in leakage from the damaged pump 100. The damaged areas 152 can be treated to remove material at the damaged areas 152, thereby forming one or more machined surfaces. The machined surfaces can then be welded, and the resultant weld(s) can be laser shock peened to form a replacement weld, like the welds 158. By virtue of the laser shock peening, the welds 158 have residual compressive stresses, which have improved strength characteristics in applications described herein.

While aspects of the present disclosure have been particularly shown and described with reference to the examples above, it will be understood by those skilled in the art that various additional implementations may be contemplated by the modification of the disclosed machines, systems and methods without departing from the spirit and scope of what is disclosed. Such implementations should be understood to fall within the scope of the present disclosure as determined based upon the claims and any equivalents thereof

What is claimed is:

1. A method comprising:
   providing a power end frame for a pump, the power end frame comprising a face plate and a housing;
   forming a weld proximate a junction of the face plate and a portion of the housing; and
   laser shock peening at least one of the weld or a surface proximate to the weld to form a treated surface proximate to and below the weld, wherein the treated surface is covered by the weld, the treated surface having a residual compressive stress below the surface of the weld resulting from the laser shock peening.

2. The method of claim 1, further comprising:
   processing the weld to form a processed weld surface, wherein the laser shock peening comprises laser shock peening the processed weld surface.

3. The method of claim 2 wherein the processing the weld comprises applying a post-weld stress relief including at least one of heating the weld or maintaining a temperature of the weld.

4. The method of claim 2 wherein the processing the weld comprises machining the weld to form the processed weld surface.

5. The method of claim 1, wherein the residual compressive stress extends into the at least one of the weld or the surface proximate the weld from about 4 mm to about 8 mm.

6. The method of claim 1, wherein the residual compressive stress is from about 200 MPa to about 300 MPa.

7. The method of claim 1, wherein the providing the face plate and the at least the portion of the housing comprises providing the power end frame, the method further comprising:
   identifying a damaged portion of the power end frame proximate the face plate and the at least the portion of the housing,
   wherein the forming the weld comprises forming the weld proximate the damaged portion.

8. The method of claim 7, further comprising:
machining the damaged portion of the power end frame prior to forming the weld proximate the damaged portion.

9. The method of claim 8 wherein the machining comprises grinding the damaged portion to remove an existing weld.

10. A pump comprising:
a fluid end; and
a power end connected to the fluid end, the power end comprising:
a face plate;
a housing;
a weld formed on at least one of the face plate or the housing; and
a treated surface formed by laser shock peening on a material comprising the weld or a surface proximate to and below the weld, wherein the treated surface is covered by the weld, the treated surface having an induced residual compressive stress.

11. The pump of claim 10 wherein the weld is formed at a junction of the face plate and the housing to secure the face plate to the housing.

12. The pump of claim 10 wherein the treated surface is a machined surface, machined prior to the laser shock peening forming the residual compressive stress.

13. The pump of claim 10 wherein the residual compressive stress is from about 200 MPa to about 300 MPa.

14. The pump of claim 10 wherein the residual compressive stress extends into the treated surface from about 4 mm to about 8 mm.

15. The pump of claim 10 further comprising:
a first end plate secured to a first end of the housing at a first junction;
a second end plate secured to a second end of the housing at a second junction; and
at least one additional treated surface proximate at least one of the first junction or the second junction.

16. A method of repairing a damaged power end of a pump, the method comprising:
providing the damaged power end;
identifying a damaged portion of the damaged power end;
removing material proximate the damaged portion to create one or more machined surfaces;
forming a weld on the one or more machined surfaces; and
laser shock peening at least one of the weld or a surface proximate to the weld to form a treated surface proximate to and below the weld, wherein the treated surface is covered by the weld, the treated surface having a residual compressive stress below the surface of the weld resulting from the laser shock peening.

17. The method of claim 16, further comprising:
processing the weld to form a processed weld surface, wherein the laser shock peening comprises laser shock peening the processed weld surface.

18. The method of claim 17, wherein the processing the weld comprises at least one of applying a post-weld stress relief or machining the weld to form the processed weld surface.

19. The method of claim 16, wherein the residual compressive stress extends into the at least one of the weld or the surface proximate the weld from about 4 mm to about 8 mm.

20. The method of claim 16, wherein the residual compressive stress is from about 200 MPa to about 300 MPa.

* * * * *